United States Patent [19]

Berner et al.

[11] Patent Number: 5,387,304
[45] Date of Patent: Feb. 7, 1995

[54] APPLICATION OF A PAINTED CARRIER FILM TO A THREE-DIMENSIONAL SUBSTRATE

[75] Inventors: Godwin Berner, Binningen; Ljubomir Misev, Allschwil, both of Switzerland

[73] Assignee: Ciba-Geigy Corporation, Ardsley, N.Y.

[21] Appl. No.: 32,152

[22] Filed: Mar. 15, 1993

Related U.S. Application Data

[63] Continuation of Ser. No. 783,445, Oct. 25, 1991, abandoned, which is a continuation-in-part of Ser. No. 411,338, Sep. 22, 1989, abandoned.

[30] Foreign Application Priority Data

Sep. 27, 1988 [CH] Switzerland ............... 3574/88

[51] Int. Cl.⁶ ............................................ B32B 27/16
[52] U.S. Cl. ................................. 156/212; 156/272.2
[58] Field of Search ............... 427/487, 514, 508; 156/212, 278, 272.2; 428/345

[56] References Cited

U.S. PATENT DOCUMENTS

| | | | |
|---|---|---|---|
| 3,552,986 | 1/1971 | Bassemir et al. ............ | 117/12 |
| 3,895,171 | 7/1975 | Deermud et al. ............ | 428/461 |
| 4,246,315 | 1/1981 | Keep et al. ................ | 428/315 |
| 4,339,566 | 7/1982 | Kasenkranz et al. .......... | 528/68 |
| 4,410,560 | 10/1983 | Kesterka ................... | 427/44 |
| 4,610,898 | 9/1986 | Engel et al. ............... | 427/379 |
| 4,842,906 | 6/1989 | Ekdahl et al. .............. | 428/34.2 |

FOREIGN PATENT DOCUMENTS

| | | |
|---|---|---|
| 251546 | 1/1988 | European Pat. Off. . |
| 0361351 | 4/1990 | European Pat. Off. . |
| 3314729 | 10/1987 | Germany . |

OTHER PUBLICATIONS

Derwent Abstract 84-276615/45.
Billmeyer, Jr., Textbook of Polymer Science, Third Edition, pp. 82-85.

*Primary Examiner*—Caleb Weston
*Assistant Examiner*—Michele K. Yoder
*Attorney, Agent, or Firm*—William A. Teoli, Jr.

[57] ABSTRACT

A carrier film is coated on one side with a radiation curable paint and on the other with an adhesive. The paint is partially cured by irradiation, the carrier film is heated and, in the thermoplastic state, applied by deep drawing to a three-dimensional substrate. In a final step the paint is completely cured by heat.

18 Claims, No Drawings

APPLICATION OF A PAINTED CARRIER FILM TO A THREE-DIMENSIONAL SUBSTRATE

This application is a continuation of application Ser. No. 7/783,445, filed Oct. 10, 1991, which is a continuation-in-part of Ser. No. 07/411,338 filed Sep. 22, 1989, both now abandoned.

The present invention relates to a method of applying a painted carrier film to a three-dimensional substrate, especially the step of applying the paint to said carrier film.

A method of coating automobile panels with a painted carrier film is disclosed in European patent application 0 251 546. This method consists in coating one side of the carrier film with a pigmented paint, which is heat cured. The other side of the carrier film is coated with an adhesive which can be heat activated. The carrier film so coated with paint and adhesive is then heated until it is sufficiently soft for deep drawing. The hot film is then applied to the automobile panel under vacuum, such that the adhesive binds the film permanently to said panel. Compared with the conventional method of painting, this method has the advantage of being technologically simpler and of ensuring a uniform thickness of the coating over the entire area of the three-dimensional substrate.

A particular difficulty of this method resides in the heat curing of the paint on the carrier film prior to its application to the substrate. In the required curing temperature range (ca. 120°–150° C.), many carrier films soften and, in the process, lose their shape. For this reason, only films which are resistant to high temperature can be used, and this in turn requires high temperatures for the later step of heating the carrier film until it is soft. Moreover this method imposes a limitation on the mechanical properties of the paint, in that only flexible paints are suited for performing the process of deep drawing. Good flexibility, however, normally entails insufficient hardness and toughness—two important paint properties, especially in automotive applications.

It has now been found that the curing of the paint to a tack-free thermoplastic state can be effected at room temperature and in a short time by using as paint a radiation curable paint and by partially curing said paint on the carrier film by irradiation. As a result of its thermoplasticity, the partially cured, tack-free paint exhibits sufficient flexibility for performing the subsequent step of deep drawing at temperatures at which the carrier film becomes sufficiently soft. According to the present invention, the good mechanical properties of the paint, such as hardness and toughness, are attained subsequent to deep drawing and application of the painted carrier film to the substrate by additional thermal curing of the paint.

Accordingly, the present invention provides a method of applying a painted carrier film to a three-dimensional substrate of solid material, which carrier film is first coated on one side with a paint and on the other with an adhesive, and then heating said carrier film and applying it, while hot, by stretching and deep drawing, with the adhesive-coated side to said substrate, wherein the paint used is a radiation and heat curable paint which, after application to the carrier film, is cured partially by irradiation to a tack-free thermoplastic state. The final properties of the paint are attained by subsequent thermal curing.

Irradiation may be effected with, for example, UV light or electronic beams or visible light. Irradiation is preferably effected with UV light.

The carrier film employed is preferably one made from a thermoplastic material, for example from polyethylene, polypropylene, polyvinyl chloride, polyurethane, polyester, polyamide or polyethylene terephthalate. The thickness of the carrier film is conveniently not less than 20 μm. The carrier film can be pigmented, but is preferably transparent. The carrier film may contain stabilisers, for example antioxidants, light stabilisers, processing auxiliaries, metal passivators, thiosynergists, phosphites or metal carboxylates. It may contain the further modifiers commonly used in films, for example fillers, lubricants, antistatic agents or plasticisers. The film can be provided with a surface treatment, for example with an oxidising agent, by flame treatment or by corona discharge. Such surface treatment effects a better adhesion of the paint and of the adhesive. The carrier film can be orientated by drawing in one or two directions.

The partially radiation curable paint is based on a binder or a mixture of binders which is either radically as well as cationically polymerisable, or is radically as well as acid polymerisable, or which can be cured by cationic or radical polymefisation, as well as by acid catalysis or by crosslinking involving amine or hydroxy groups. Depending on the mechanisms by means of which the binder can be cured, appropriate curing catalysts (photoinitiators and thermal curing agents) are used. In any case the process involves radiation curing in a first step and thermal curing in a second step.

The radically polymerisable binders are ethylenically unsaturated compounds. They are mono- or polyunsaturated compounds, the latter being of especial importance, as they can be polymerised to crosslinked—and hence insoluble—products.

Illustrative examples of monounsaturated compounds are acrylates or methacrylates of monohydric alcohols, acrylamides and similar acrylic acid derivatives, for example methyl acrylate, ethyl acrylate, butyl acrylate, isooctyl acrylate or hydroxyethyl acrylate, methyl or ethyl methacrylate, acrylonitrile, acrylamide, N-butyl(-methacrylamide); as well as vinyl and allyl compounds such as vinyl acetate, vinyl stearate, N-vinyl pyrrolidone, vinylidene chloride, vinyl benzene or allyl acetate.

Typical polyunsaturated compounds are acrylates, methacrylates or itaconates of polyols such as ethylene glycol diacrylate, diethylene glycol dimethacrylate, triethylene glycol diacrylate, butanediol-1,4-acrylate, propanediol-1,2-diacrylate, butanediol-1,3-dimethacrylate, neopentyl glycol diacrylate, trimethylolpropane di(meth)acrylate, trimethylolethane di(meth)acrylate, glycerol di- and triacrylate, pentaerythritol di-, tri- and tetraacrylate or pentaerythritol di-, tri- and tetramethacrylate, dipentaerythritol tetra-, penta- and hexaacrylate, dipentaerythritol tetra-, penta- and hexamethacrylate or dipentaerythritol tetra-, penta- or hexaitaconate, sorbitol tetraacrylate, sorbitol hexamethacrylate, diacrylates or dimethacrylates of 1,4-cyclohexanediol, 1,4-dimethylolcyclohexane, 2,2-bis(hydroxyphenyl)propane; of polyethylene glycols or of oligoesters or oligourethanes having hydroxyl end groups. Suitable polyunsaturated monomers which may also be used are acrylamides such as methylene bis(acrylamide), hexamethylene-1,6-bis-(acrylamide), diethylenetriamine tris(methacrylamide), bis(methacrylamidopropoxy)e- thane or 2-acrylamidoethyl acrylate. Examples of polyunsaturated vinyl and allyl compounds are divinyl benzene, ethylene glycol divinyl ether, diallyl phthalate, allyl methacrylate, diallyl maleate, trisallylisocyanurate or triallyl phosphate.

Polymeric or oligomeric polyunsaturated compounds can also be photopolymerised to crosslinked products, for example unsaturated polyesters and copolyesters of maleic acid and fumaric acid, (meth)acrylates of polyvinyl alcohol or homopolymers or copolymers of butadiene or isoprene. Further useful unsaturated components are the reaction products of polyepoxides with acrylic or methacrylic acids. Suitable polyepoxides are mainly the epoxy resin precursors which are commercially available and obtainable in different molecular weights.

Mixtures of such unsaturated compounds are normally used for the photopolymerisation so as to be able to vary the properties of the polymers for the desired end use. Exemplary of such mixtures are mixtures of diacrylates with polyester acrylates or with polyurethane acrylates, mixtures of mono-, di- and triacrylates, mixtures of unsaturated polyesters of maleic acid with styrene or other mixtures of polymeric-oligomeric unsaturated compounds with di- tri- or tetraacrylates. The mixtures may consist of two, three or more unsaturated components.

Suitable photoinitiators for radically polymerisable binders are in particular aromatic carbonyl compounds. Examples of such photoinitiators are benzoin, benzil, benzophenone, the benzoin alkyl ethers, the esters of phenylglyoxylic acid, α-trichloroacetophenone, α-diethoxyacetophenone, benzil dimethyl ketal, 1-benzoylcyclohexanone, the α-hydroxyacetophenones disclosed in German Offenlegungsschrift 2 722 264, the α-aminoacetophenones disclosed in European patent application 0 88 050, 0 117 233 or 0 138 754, as well as the aroylphosphine oxides disclosed in European patent application 0 7508 or 0 40 721. These compounds are so-called α-cleavers. When subjected to radiation, they decompose into radical fission products which initiate the polymerisation of the unsaturated compounds. They are often also used in conjunction with amines such as triethanolamine, N-methyldiethanolamine, p-dimethylaminobenzoate or Michler's ketone.

Together with the photoinitiators it is also possible to use sensitisers which sensitise the photocurable system for specific wavelength ranges. Illustrative of such sensitisers are thioxanthone, anthracene and coumarin derivatives.

Thermal initiators such as benzoyl peroxide, cyclohexanone peroxide or methyl ethyl ketone peroxide may also be used together with the photoinitiators.

Cationically polymerisable binders are specific ethylenically unsaturated compounds such as isobutylene, styrene, N-vinylpyrrolidone, isoprene, butadiene, alkyl vinyl ethers or vinyl esters, or heterocyclic compounds, preferably 3- and 4-membered heterocycles such as alkylene oxides, epichlorohydrin, glycidyl ethers, glycidyl esters, epoxy resins, oxetanes, dioxolanes, trioxane, lactones, thiiranes, thietanes or azetidines.

Particularly important cationically polymerisable binders are epoxy resins, especially the diepoxides and polyepoxides and epoxy resin prepolymers of the kind used to prepare crosslinked epoxy resins. The diepoxides and polyepoxides may be aliphatic, cycloaliphatic or aromatic compounds. Illustrative of such compounds are the glycidyl ethers and β-methyl glycidyl ethers of aliphatic or cycloaliphatic diols or polyols, for example those of ethylene glycol, propane-1,2-diol, propane-1,3-diol, butane-1,4-diol, diethylene glycol, polyethylene glycol, polypropylene glycol, glycerol, trimethylolpropane or 1,4-dimethylolcyclohexane or of 2,2-bis(hydroxycyclohexyl)propane and N,N-bis(2-hydroxyethyl)aniline; the glycidyl ethers of diphenols and polyphenols, for example resorcinol, 4,4'-dihydroxydiphenylmethane, 4,4'-dihydroxydiphenyl-2,2-propane, novolaks and 1,1,2,2-tetrakis(4-hydroxphenyl)ethane. Further examples are N-glycidyl compounds such as the diglycidyl compounds of ethyleneurea, 1,3-propyleneurea or 5-dimethylhydantoin or of 4,4'-methylene-5,5'-tetramethyldihydantoin, or those such as triglycidyl isocyanurate.

Further glycidyl compounds of technical importance are the glycidyl esters of carboxylic acids, especially dicarboxylic and polycarboxylic acids, for example the glycidyl esters of succinic acid, adipic acid, azelaic acid, sebacic acid, phthalic acid, terephthalic acid, tetra- and hexahydrophthalic acid, isophthalic acid or trimellitic acid, or of dimerised fatty acids.

Examples of polyepoxides different from glycidyl compounds are the diepoxides of vinyl cyclohexane and dicyclopentadiene, 3-(3'-epoxycyclohexyl)-8,9-epoxy-2,4-dioxaspiro[5.5]undecane, the 3',4'-epoxycyclohexylmethyl ester of 3,4-epoxycyclohexanecarboxylic acid, butadiene diepoxide or isoprene diepoxide, epoxidised linoleic acid derivatives or epoxidised polybutadiene.

Particularly suitable photoinitiators for cationically curable binders are the aromatic sulfonic and iodonium salts disclosed in U.S. Pat. Nos. 4,058,401, 4,069,054 or 4,394,403. Further initiators are the arene cyclopentadienyliron(II) salts disclosed in European patent application 0 94 915.

These cationic photoinitiators too can be used in conjunction with a sensitiser, as described in European patent application 0 152 377. In conjunction with oxidising agents, especially with peroxide compounds, the iron(II) salts mentioned above can be used for cationic as well as for radical photocuring as taught in European patent application 0 126 712.

With the aid of the iron(II) complex salts it is also possible to effect the radiation curing of two-component polyurethanes as taught in European patent application 0 250 364. The polyurethanes are formed from a polyol and a polyisocyanate. The polyol is preferably a hydroxyl group containing acrylic or epoxy resins. A blocked polyisocyanate can also be used as polyisocyanate.

Binders which can be cured by acid catalysis may be radiation cured if the initiator used is a compound which generates an acid when irradiated. Examples or such curable binders are specific alkyd resins, acrylic resins, polyester resins, melamine resins, urea resins, phenolic resins and mixtures thereof, especially the mixtures of alkyd, acrylic and polyester resins with melamine resins. In particular they are etherified melamine resins which are used for acid-curable paints. The polymerisation is carried out, when using these resins, not by addition polymerisation but by polycondensation. The photoinitiators used for such systems are compounds which generate an acid when irradiated. Examples of such photoinitiators are the benzoin sulfonates disclosed in European patent application 0 84 515 or 0 89 922, or the oxime sulfates disclosed in European patent application 0 139 609.

Particularly useful binders are hybrid systems. These can be, for instance, mixtures of radically or cationically curable and acid-catalysed curable compounds which contain a radical or cationic photoinitiator as well as an acid-generating photoinitiator (e.g., a hybrid e resin carrying both radically photopolymerisable and acid crosslinkable groups). Irradiation of such hybrid systems effects initially only the polymerisation of the radically or cationically curable component and the generation of the acid from the acid catalyst. Subsequent heating of the system induces the polycondensation of the acid-curable component. Mixtures of hydroxyl group containing acrylates and melamine resins are exemplary of such hybrid systems. Linear polyacrylates are formed in the first (radical) curing step and are crosslinked in the second (thermal) curing step by the melamine resin.

All these types of photocurable binders are either mixed with a pigment or they are used unpigmented as clear coating. Suitable pigments are all customary inorganic, organic or metallic pigments.

The paints may contain light stabilisers, for example UV absorbers from the class of the benzotriazoles, benzophenones or oxanilides, but preferably sterically hindered amines (HALS), for example derivatives of 2,2,6,6-tetramethylpiperidine. Further ingredients which may be added to the paint are antioxidants, levelling agents, couplers or thixotropic agents. For application, the paint may be diluted with solvent, but it is preferred to use a solvent-free paint.

The paint is applied to the top side of the carrier film in a thin layer, using conventional techniques of applying paints, for example brushing, knife-coating, casting, extruding, roll coating or spraying. If a solvent is used, then it is allowed to evaporate substantially after application of the paint. This drying can be accelerated by gentle heating (for example by infrared irradiation). The paint is then irradiated with energy-rich sources of radiation. Such sources are suitably in particular UV radiants such as mercury low-pressure, medium-pressure or high-pressure lamps, xenon lamps, argon lamps or metal halide lamps. The light of these lamps is rich in short-wave light having a wavelength in the range of 200–600 nm. Laser beams are also suitable, as are also electron beams.

The paint can also be applied in two layers. For example, it is possible first to apply a pigmented paint and then over it a coat of clear paint which contains a light stabiliser. The radiation curing of the two layers can be effected individually or jointly.

A complete cure (crosslinking) of the paint is not intended when effecting the radiation curing. The paint need only be cured to such a degree that it has a wipe-resistant finish. Complete curing is effected when the carrier film is heated in the final process step.

In a special embodiment of the method of this invention, the paint is converted by irradiation into a thermoplastic state after application to the carrier film (pre-cured) and heat-crosslinked (postcured) after application of the carrier film to the substrate. The heat-crosslinking is preferably carried out by heating to 100°–160° C.

The underside of the carrier film is coated with an adhesive. This can be done before or after application of the paint. The adhesive can be, for example, a hot melt adhesive which is solid at normal temperature. It can be applied to the carrier film from solution or from the melt, and is dried or allowed to cool on the carrier film.

The adhesive may also be a contact adhesive which is soft and adhesive at room temperature. In this case, the carrier film is provided with an anti-adhesive protective backing after application of the adhesive (from solution or in the melt), which backing is stripped off before the carrier film is applied to the three-dimensional substrate.

It is also possible to apply precursors (monomers, oligomers) from which a (polymeric) adhesive is formed by irradiation with UV light or electron beams. The adhesive can therefore also be a material which can be cured or activated by radiation.

Before application to the three dimensional substrate, the carrier film coated on the top side with paint and on the underside with adhesive is plastified. The adhesive can also be activated by this procedure, and activation can also be completed by the curing of the paint.

In one embodiment, the paint is based on a mixture of radically photopolymerisable and cationically crosslinkable resins or on a hybrid resin carrying both radically photopolymerisable and cationically crosslinkable groups. In another embodiment, the paint is based on a mixture of cationically photopolymerisable and acid crosslinkable resins or on a hybrid resin carrying both cationically photopolymerisable and acid crosslinkable groups. In a further embodiment, the paint is based on a mixture of radically or cationically photopolymerisable and amine or hydroxy crosslinkable resins or on a hybrid resin carrying both radically or cationically photopolymerisable and amine or hydroxy crosslinkable groups.

The plastified carrier film is applied to the three-dimensional substrate by deep drawing. Firm adhesion to the substrate can be effected by applying a vacuum to the carrier film as described in European patent application 0 251 546, or the carrier film is pressed on to the substrate by pressure, for example by means of a suitably shaped press. The side of the carrier film coated with adhesive can also be bonded to the substrate by the action of electron beams.

The substrate to be coated can be made of any solid material, especially of metal, plastic, wood, glass or ceramics material. Examples of such substrates are automobile body parts or claddings of domestic appliances made of metal or plastic, or furniture or furniture parts made of wood.

The following Example illustrates in detail how the method can be performed. Parts and percentages are by weight, unless otherwise stated.

EXAMPLE 1

A hybrid system is prepared by mixing a radical curable component A, comprising
60 parts of a urethane acrylate (Ebecryl ®284, UCB)
25 pans of hydroxyethyl acrylate
8 parts of ethoxyethoxyethyl acrylate (Sartomer ®256, ARCO)
7 parts of 2-hydroxyethyl methacrylate
6 parts of a radical photoinitiator (Irgacure ®184, Ciba-Geigy)
and a component B, which is curable by the catalytic effect of a photodeblockable acid, comprising
25 parts of an alkylated melamine resin (Cymel ®303, American Cyanamid)
75 parts of an acrylic polyol (Paraloid ®AT 400, Roehm)
6 parts of a photodeblockable acid catalyst
(2-Oxo-1,2-diphenylethyl-p-dodecylbenzene sulfonic acid ester) in a ratio 1:1.

The paint is curtain coated in a continuous process on a 200 μm thick film of polyvinylchloride and, at a speed of 10 m/min, is polymerised to a 30 μm film under four pairs of 80 W/cm mercury medium-pressure lamps positioned at regular intervals of two meters. The painted film is turned by guide rolls such that, in a subsequent step, a hot melt adhesive can be curtain coated hot on the non-painted side of the film. When the hot melt adhesive has cooled, the film, which is now non-tacky on both sides, is wound on to a roll and stored for further use.

The treated carrier film is used for coating a metal automobile body pan. The procedure is that, first, a sufficiently large segment of the film is clamped into a frame and placed over a vacuum chamber such that the adhesive-coated side of the carrier film and the side of the automobile part to be coated are adjacent. The carrier film is then plastified by heating with hot air to ca. 160° C., whereupon the adhesive is also activated, i.e. melted. The hot carrier film is deep drawn by evacuating the air present in the vacuum chamber and applied to the automobile part.

The automobile part coated with the carrier film is then further heated for 20 minutes with hot air of ca. 150° C., whereupon a crosslinking and thus complete curing of the paint film takes place through the action of the acid catalyst released in the course of the UV irradiation. When the adhesive has cooled, the painted film is firmly and permanently bonded to the automobile part. A paint cured for 20 minutes at 150° C. has a pendulum hardness according to Koenig (DIN 53 157) of 162 seconds (measured on glass).

What is claimed is:

1. A method of applying a painted carrier film to a three dimensional substrate of solid material, which carrier film is coated on one side with paint and on the other side with an adhesive, and then heating said carrier film and applying it, while hot, by stretching and deep drawing, with the adhesive coated side to said substrate, wherein the paint used is both a radiation and heat curable :paint which is cured in a first step after application to the carrier film, prior to application to the substrate, into a tack-free thermoplastic state by irradiation and is heat-crosslinked in a second step after application of the carrier film to the substrate.

2. A method according to claim 1, wherein irradiation is effected with UV light or electron beams or with visible light.

3. A method according to claim 2, wherein irradiation is effected with UV light.

4. A method according to claim 1, wherein the paint is based on a hybrid e resin carrying both radically photopolymerisable and acid crosslinkable groups.

5. A method according to claim 1, wherein the paint is based on a mixture of radically photopolymerisable and cationically crosslinkable resins.

6. A method according to claim 1, wherein the paint is based on a hybrid resin carrying both cationically photopolymerisable and acid crosslinkable groups.

7. A method according to claim 1, wherein the paint is based on a mixture of radically or cationically photopolymerisable and amine or hydroxy crosslinkable resins.

8. A method according to claim 1, wherein the paint is applied in two layers.

9. A method according to claim 1, wherein the paint contains at least one photoinitiator.

10. A method according to claim 1, wherein the paint contains a light stabiliser.

11. A method according to claim 1, wherein the heat-crosslinking is carrier out in the temperature range from 100° to 160° C.

12. A method according to claim 1, wherein the three-dimensional substrate is of metal, plastic, wood, glass or ceramics material.

13. A method according to claim 12, wherein the substrate is an automobile body part and consists of metal or plastics material.

14. A method according to claim 1, wherein the adhesive is a material which can be cured or activated by irradiation.

15. A method according to claim 1, wherein the paint is based on a mixture of radically photopolymerisable and acid crosslinkable resins.

16. A method according to claim 1, wherein the paint is based on a hybrid resin carrying both radically photopolymerisable and cationically crosslinkable groups.

17. A method according to claim 1, wherein the paint is based on a mixture of cationically photopolymerisable and acid crosslinkable resins.

18. A method according to claim 1, wherein the paint is based on a hybrid resin carrying both radically or cationically photopolymerisable and amine or hydroxy crosslinkable groups.

* * * * *